(12) United States Patent
Gschwind

(10) Patent No.: US 9,514,301 B1
(45) Date of Patent: Dec. 6, 2016

(54) INTERLINKING MODULES WITH DIFFERING PROTECTIONS USING STACK INDICATORS

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/989,329

(22) Filed: Jan. 6, 2016

(51) Int. Cl.
G06F 21/71 (2013.01)
G06F 21/52 (2013.01)

(52) U.S. Cl.
CPC ......... *G06F 21/52* (2013.01); *G06F 2221/033* (2013.01)

(58) Field of Classification Search
CPC ......... G06F 21/566; G06F 21/54; G06F 21/52
See application file for complete search history.

(56) References Cited

U.S. PATENT DOCUMENTS

| | | | |
|---|---|---|---|
| 6,301,699 B1 | 10/2001 | Hollander et al. | |
| 6,912,653 B2 | 6/2005 | Gohl | |
| 6,941,473 B2 | 9/2005 | Etoh et al. | |
| 7,272,748 B1 | 9/2007 | Conover et al. | |
| 7,380,245 B1 | 5/2008 | Lovette | |
| 7,467,272 B2 | 12/2008 | Genty et al. | |
| 7,546,587 B2 | 6/2009 | Marr et al. | |
| 7,581,089 B1 | 8/2009 | White | |
| 7,827,612 B2 | 11/2010 | Saito | |
| 8,099,636 B2 | 1/2012 | Tilton et al. | |
| 8,104,021 B2 | 1/2012 | Erlingsson et al. | |
| 8,245,002 B2 | 8/2012 | Attinella et al. | |
| 8,412,953 B2 | 4/2013 | Lerouge et al. | |
| 8,458,487 B1 | 6/2013 | Palgon et al. | |
| 8,479,005 B2 | 7/2013 | Kojima et al. | |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Izunna Okeke
(74) *Attorney, Agent, or Firm* — William A. Kinnaman, Jr., Esq.; Rachel L. Pearlman, Esq.; Heslin Rothenberg Farley & Mesiti P.C.

(57) ABSTRACT

Corruption of program stacks is detected by using guard words placed in the program stacks. A called routine or module executing on a processor checks a guard word in a stack frame of a calling routine or module. The checking determines whether the guard word has an expected value. Based on determining the guard word has an unexpected value, an indication of corruption of the stack frame is provided. Some modules, however, may not support use of guard words. Thus, modules that are interlinked may have differing protection capabilities. A determination is made as to the differing protection capabilities, an indication of the same is provided and the modules are executed with failing due to the differing protection capabilities.

11 Claims, 18 Drawing Sheets

(56) References Cited

U.S. PATENT DOCUMENTS

| | | | |
|---|---|---|---|
| 8,499,354 | B1 | 7/2013 | Satish et al. |
| 8,806,439 | B1 | 8/2014 | Asher |
| 8,850,408 | B2 | 9/2014 | Hinkle |
| 9,251,373 | B2 | 2/2016 | AlHarbi et al. |
| 2004/0103252 | A1 | 5/2004 | Lee |
| 2004/0133777 | A1 | 7/2004 | Kiriansky et al. |
| 2006/0161739 | A1 | 7/2006 | Genty et al. |
| 2008/0140884 | A1 | 6/2008 | Enbody et al. |
| 2013/0013965 | A1 | 1/2013 | Guillemin et al. |
| 2013/0283017 | A1 | 10/2013 | Wilkerson et al. |
| 2014/0096247 | A1* | 4/2014 | Fischer .......... G06F 21/52 726/23 |
| 2014/0283040 | A1 | 9/2014 | Wilkerson et al. |
| 2014/0283088 | A1 | 9/2014 | AlHarbi et al. |
| 2015/0007266 | A1 | 1/2015 | Wang |
| 2015/0020201 | A1 | 1/2015 | Kishi |
| 2015/0067279 | A1 | 3/2015 | Costin |
| 2015/0220453 | A1 | 8/2015 | Heisswolf et al. |
| 2016/0094552 | A1 | 3/2016 | Durham et al. |
| 2016/0132374 | A1 | 5/2016 | Mayer et al. |
| 2016/0147586 | A1 | 5/2016 | Mayer |
| 2016/0171211 | A1 | 6/2016 | Chen et al. |
| 2016/0224784 | A1 | 8/2016 | Krishnaswamy et al. |

OTHER PUBLICATIONS

IBM, "z/Architecture—Principles of Operation," IBM Publication No. SA22-7832-10, Eleventh Edition, Mar. 2015, pp. 1-1732.

IBM, "Power ISA—V 2.07B," Apr. 9, 2015, pp. 1-1527.

Corliss, et al., "Using DISE to Protect Return Addresses From Attack," ACM SIGARCH Computer Architecture News—Special Issue: Workshop on Architectural Support for security and Anti-Virus, vol. 33, Issue 1, Mar. 2005, pp. 65-72.

Kumar et al., "A System for Coarse Grained Memory Protection in Tiny Embedded Processors," $44^{th}$ ACM/IEEE Design Automation Conference, Jun. 2007, pp. 218-223.

Microsoft et al., "Predicting Buffer Overflows Using Shimming Technology," IPCOM000133490, no date information available, pp. 1-10 (+ cover).

IBM, Hardware Support for Avoiding Buffer Overflow Attacks, Jun. 2007, p. 1 (+ cover).

IBM, "System Level Overflow Prevention (SLOP)," IPCOM000126868D, Aug. 2005, pp. 1-2 (+ cover).

Houghtalen, Sr, "Hardware Stack Overflow Monitor," IPCOM000066460D, Mar. 1979, pp. 1-2.

Cowan, et al., "StackGuard: Automatic Adaptive Detection and Prevention of Buffer-Overflow Attacks," Proceedings of the $7^{th}$ USENIX Security Symposium, Jan. 1998, pp. 1-16.

IBM et al., "Inside and Outside Protection Keys with Dynamic Relocation," IPCOM000090679D, Jun. 1969, pp. 1-2 (+ cover).

Lin, Wang, "Study on the Principle and Defense of Buffer Overflow Attacks," International Conference on Graphic and Image Processing, Mar. 2013, pp. 1-7.

Gschwind, Michael K., "Interlinking Routines With Differing Protections Using Stack Indicators," U.S. Appl. No. 14/989,214, filed Jan. 6, 2016, pp. 1-64.

Gschwind, Michael K., "Architected Store and Verify Guard Words Instruction," U.S. Appl. No. 14/989,240, filed Jan. 6, 2016, pp. 1-65.

Gschwind et al., "Detection of Corruption of Call Stacks," U.S. Appl. No. 14/989,274, filed Jan. 6, 2016, pp. 1-63.

Duvalsaint et al., "Caller Protected Stack Return Address in a Hardware Managed Stack Architecture," U.S. Appl. No. 14/989,397, filed Jan. 6, 2016, pp. 1-66.

Duvalsaint et al., "Providing Instructions to Protect Stack Return Addresses in a Hardware Managed Stack Architecture," U.S. Appl. No. 14/989,459, filed Jan. 6, 2016, pp. 1-67.

Gschwind et al., "Providing Instructions to Facilitate Detection of Corrupt Stacks," U.S. Appl. No. 14/989,440, filed Jan. 6, 2016, pp. 1-67.

List of IBM Patents or Patent Applications Treated As Related, Feb. 10, 2016, 2 pages.

Notice of Allowance for U.S. Appl. No. 14/989,329 dated Aug. 8, 2016, pp. 1-12.

\* cited by examiner

INTERLINKING MODULES WITH DIFFERING PROTECTIONS USING STACK INDICATORS

BACKGROUND

One or more aspects relate, in general, to processing within a computing environment, and in particular, to protecting data of the computing environment.

Corruption of computer programs may occur in many forms. One such form is the overwriting of data causing the program to perform tasks or return to addresses that are unexpected. This corruption may be innocent or malicious. As a particular example, the corruption may occur in a call stack (also referred to as a stack) used by a computer program to store information about the active subroutines of the computer program. For example, a stack is used to keep track of the point to which an active subroutine should return control (i.e., return address) when the routine finishes executing. An active subroutine is one that has been called, but is yet to complete execution. Such activations of subroutines may be nested to any level (recursive as a special case), hence the stack structure. Stacks may be corrupted by overwriting the return addresses, thereby having a called subroutine return to an unexpected location.

Again, the overwriting of the return address may be innocent or malicious, but regardless, is to be detected and planned for such that the program or other data is not corrupted.

SUMMARY

Shortcomings of the prior art are overcome and additional advantages are provided through the provision of a computer program product for facilitating linking of modules of a computing environment. The computer program product includes a storage medium readable by a processing circuit and storing instructions for execution by the processing circuit for performing a method. The method includes, for instance, determining whether one module to be executed by a processor of the computing environment supports use of a guard word to protect a stack frame of the computing environment; determining whether another module to be linked with the one module supports use of the guard word to protect the stack frame; and based on determining that at least one of the one module and the other module fails to support use of the guard word to protect the stack frame, providing an indication that the one module and the other module are linked modules not supporting use of the guard word. This enables modules with differing protections to execute without failing due to the differing protections.

As one example, the one module supports use of the guard word and the other module does not support use of the guard word. The one module includes at least one of a store guard word condition instruction or a verify guard word condition instruction to be used in at least one of initializing or verifying the guard word in the stack frame.

In one aspect, based on determining that the one module and the other module support use of the guard word, providing an indication that the one module and the other module are linked modules supporting use of the guard word.

In one embodiment, the one module is a caller module and the other module is a called module called by the caller module, and wherein the one module includes a store guard word condition instruction to be used by the caller module to write the guard word in the stack frame based on determining the one module and the other module support use of the guard word.

As a further embodiment, the other module includes a verify guard word condition instruction to be used by the called module to check the guard word of the stack frame based on determining the one module and the other module support use of the guard word to determine whether the guard word is an expected value.

In a further aspect, the method includes executing the verify guard word condition instruction by the called module, and returning to a return address in the stack frame based on the guard word being the expected value. In another aspect, the method includes executing the verify guard word condition instruction by the called module, and failing to return to a return address in the stack frame based on the guard word being an unexpected value.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

One or more aspects relate to using a guard word to protect a call stack. The guard word is placed in a stack frame of a caller's call stack and checked by one or more called routines. If the checking indicates the guard word is different than expected (i.e., has been changed), then an indication of a corrupt stack is provided.

In one example, architected guard word instructions (e.g., hardware instructions) are provided to initialize and verify a stack guard word in order to prevent code injection/execution attacks from malicious system users. Use of the guard word instructions may facilitate using the guard word and/or enhance system security.

In yet a further aspect, it is recognized that not all routines or modules (e.g., one or more routines) that may be linked with one another, e.g., by being called from a routine or otherwise, may support the guard word protection facility, and therefore, one or more features are provided that enable such routines or modules with differing protection capabilities to be interlinked without causing a fatal error.

One embodiment of a computing environment to incorporate and/or use one or more aspects of the present invention is described with reference to FIG. 1. In one example, computing environment 100 includes at least one computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types.

Figure 1:
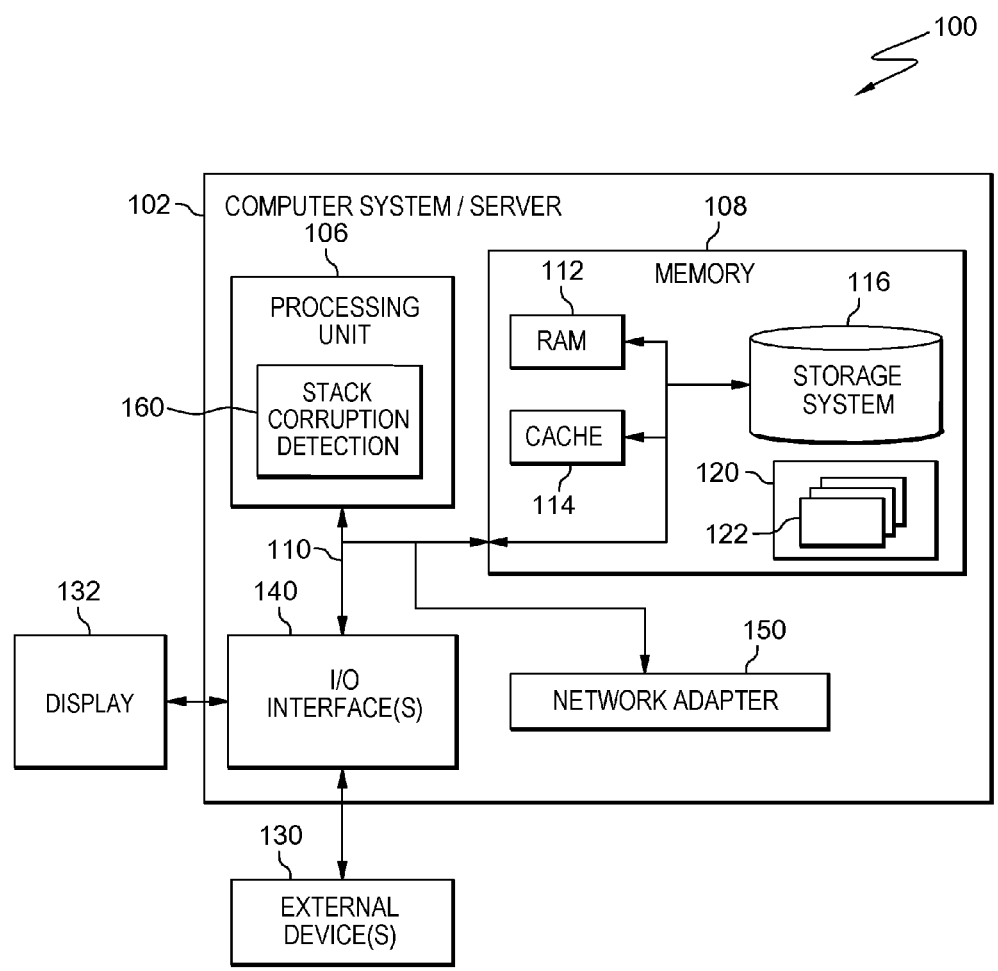
FIG. 1 depicts one example of a computer system/server of a computing environment to incorporate and/or use one or more aspects of the present invention.

As depicted in FIG. 1, computer system/server 102 is shown in the form of a general-purpose computing device. The components of computer system/server 102 may include, but are not limited to, one or more processors or processing units 106, a system memory 108, and a bus 110 that couples various system components including system memory 108 to processor 106.

In one embodiment, processor 106 is based on the z/Architecture offered by International Business Machines Corporation, or other architectures offered by International Business Machines Corporation or other companies. z/Architecture is a registered trademark of International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Processor 106 includes, in one embodiment, stack corruption detection logic 160 used to determine whether a guard word in a stack frame has an unexpected value, therefore, indicating that a return address in the stack frame has been overwritten. Stack corruption detection logic 160 may use, in one embodiment, instructions to initialize and verify the guard word, and/or the interlinking features described herein.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 108 can include computer system readable media in the form of volatile memory, such as random access memory (RAM) 112 and/or cache memory 114. Computer system/server 102 may further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 110 by one or more data media interfaces. As will be further depicted and described below, memory 108 may include at least one program product having a set (e.g., at least one) of program modules that are configured to carry out the functions of embodiments of the invention.

Program/utility 120, having a set (at least one) of program modules 122, may be stored in memory 108 by way of example, and not limitation, as well as an operating system, one or more application programs, other program modules, and program data. Each of the operating system, one or more application programs, other program modules, and program data or some combination thereof, may include an implementation of a networking environment. Program modules 122 generally carry out the functions and/or methodologies of embodiments of the invention as described herein.

Computer system/server 102 may also communicate with one or more external devices 130 such as a keyboard, a pointing device, a display 132, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 140. Still yet, computer system/server 102 can communicate with one or more networks such as a local area network (LAN), a general wide area network (WAN), and/or a public network (e.g., the Internet) via network adapter 150. As depicted, network adapter 150 communicates with the other components of computer system/server 102 via bus 110. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Figure 2A:
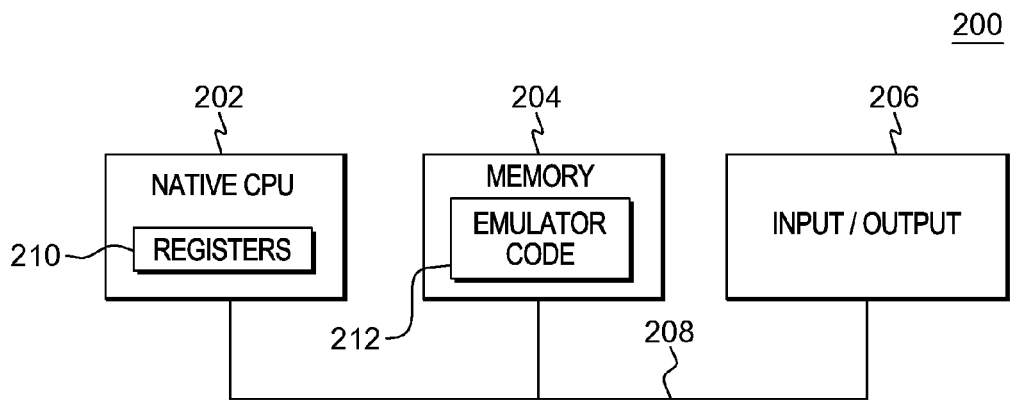
FIG. 2A depicts another example of a computing environment to incorporate and/or use one or more aspects of the present invention.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
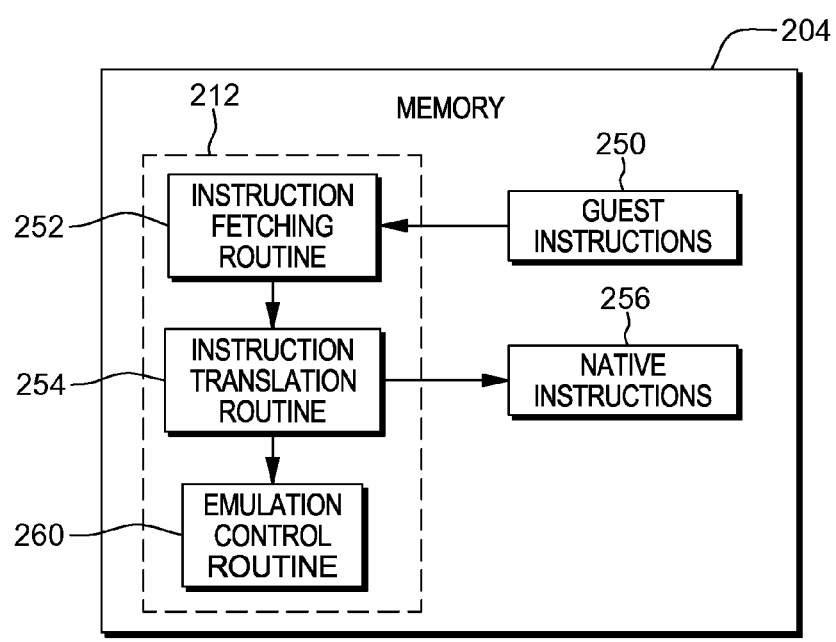
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Within a processing environment, a stack is used by a routine to track the point at which the routine should return control when it finishes executing. As used herein, a routine is program code, and may include a subroutine, function, method, etc. One routine may be called by another routine. The one routine performing the calling is referred to as the calling routine or the caller routine, and the routine being called is referred to as the called routine or the callee routine. One example of a stack is described with reference to FIG. 3A. This stack may be in memory 108, as an example.

Figure 3A:
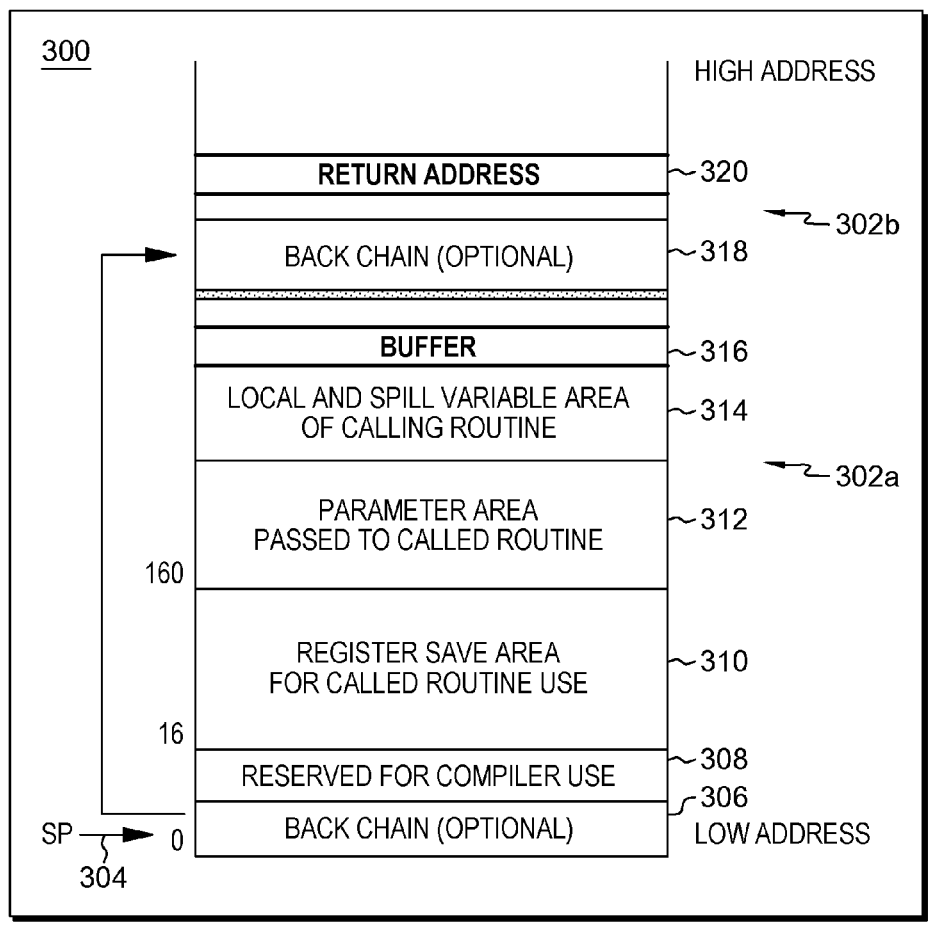
FIG. 3A depicts one example of a stack frame used in accordance with an aspect of the present invention.

As shown in FIG. 3A, a stack 300 includes a plurality of stack frames, such as stack frames 302a, 302b. A stack frame is a frame of data that gets pushed onto the stack. The data of a stack frame may vary; however, in one example, a stack frame 302a includes a stack pointer 304, an optional back chain 306 pointing to the next stack frame 302b and to be used to walk back through the processing of stack frames; an area reserved for compiler use 308, which includes an area for a return address for use by a called routine called from a routine of the present stack frame; a register save area 310 of one or more registers for use by a called routine and to be restored prior to returning; a parameter area 312 passed to a called routine; a local and spill variable area 314 of a calling routine; and a buffer 316. The next stack frame 302b starts with, for instance, another optional back chain 318; and includes a return address 320 (which is part of the reserved for compiler use area of stack frame 302b) used by a called routine to know where to return; and may include additional information as well, as described above. A stack frame may include additional, less and/or different data than described herein.

Figure 3B:
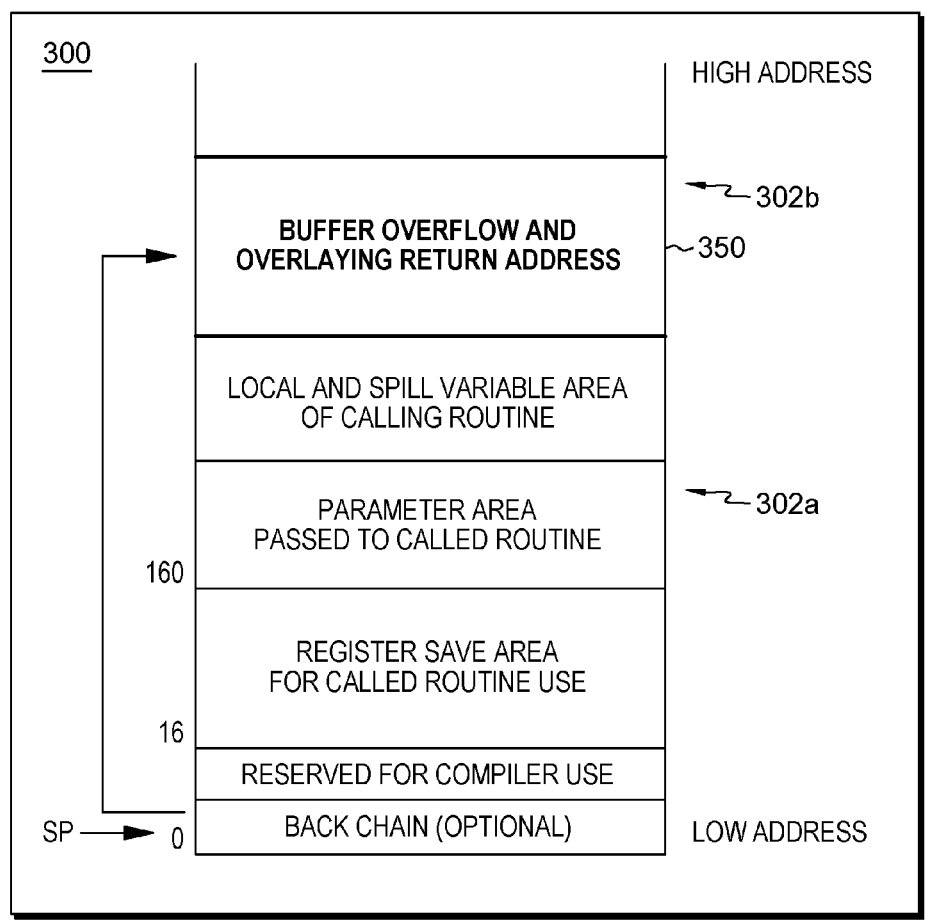
FIG. 3B depicts one example of a buffer overflow.

One form of corruption related to computer processing is to overflow buffer 316, in which more data than can be accepted by the buffer is written to the buffer, overflowing the buffer and overwriting return address 320, as depicted in FIG. 3B at 350. In overwriting the return address, a different address may be placed there directing the returning routine to other code that may perform a task that should not be performed and may even be malicious.

Figure 4:
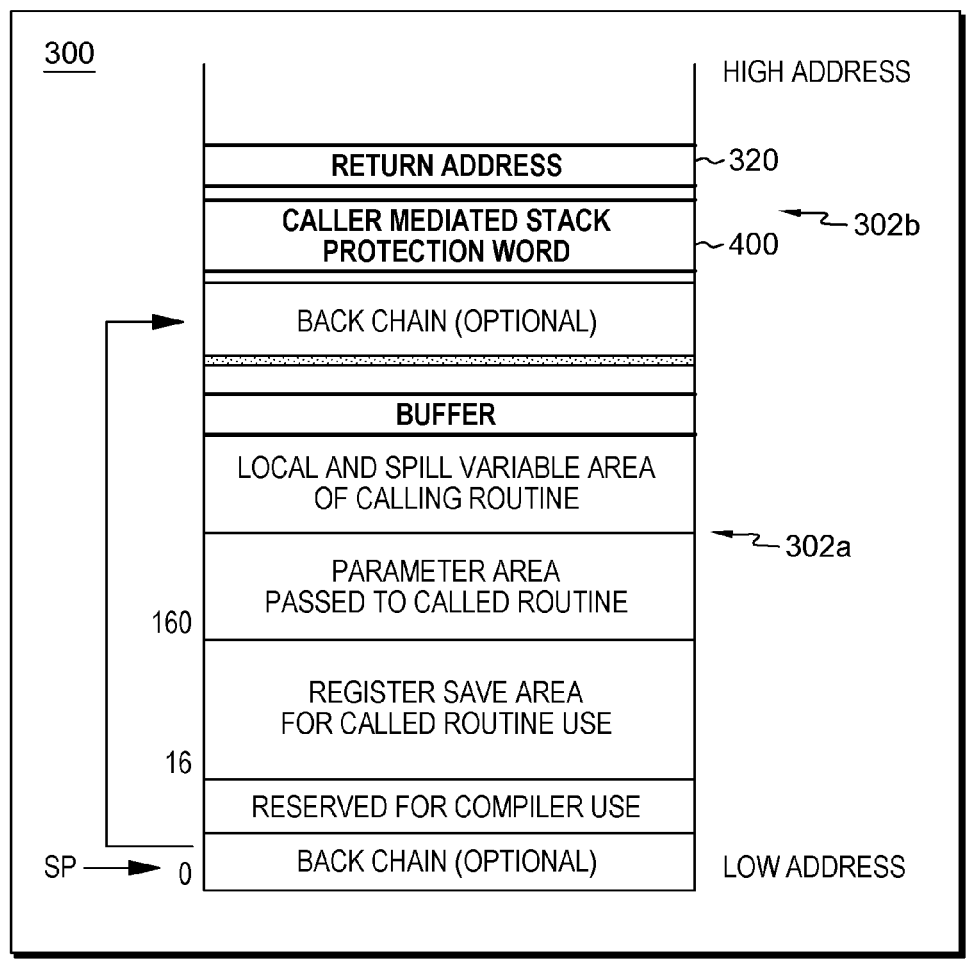
FIG. 4 depicts one example of a guard word included in a caller's stack frame, in accordance with an aspect of the present invention.

Thus, in accordance with an aspect of the present invention, a guard word is placed in the stack frame to detect such overflow. The guard word may be any value (e.g., numerical, alphanumeric, alphabetic, include symbols, etc.), and may be any desired size. The position of the guard word is agreed upon by the routines, in one example, or at least an indication of the position is provided to the routines that use the stack frame. In one embodiment, the presence and location of a guard word is specified by an application binary interface (ABI). In one example, referring to FIG. 4, a guard word 400 (also referred to herein as a protection word, a caller-mediated stack protection word, etc.) is written by the caller routine and is placed next to, or in close proximity to, the area for return address 320. As an example, the guard word corresponds to a memory location between the return address in the caller's stack frame and the callee's stack frame.

In accordance with one or more aspects, the guard word is provided by the caller routine and verified by the called routine, as described below. The caller writes the guard word once, e.g., when it first allocates a stack frame; and that once written guard word is used by one or more callees. That is, the guard word protects returns from the one or more callees. Each callee checks the guard word prior to returning to determine whether it has an expected value. If it does have the expected value, then the callee returns to the return address, as expected. Otherwise, an indication of a corrupt guard word is provided. Further, the program may be terminated and/or the operating system is notified to take additional actions against intrusion. In one aspect, this reduces the number of store instructions to be executed to write a guard word, compared to embodiments where a store of a guard word corresponds to each function (or other routine) call, and a check of a guard word corresponds to each function (or other routine) return. Thus, the cost of the protection mechanism is reduced. Further, in another aspect, it is ensured that guard words are available from the cache rather than the store queue, because they were written much earlier than being checked. Consequently, an expensive forwarding operation from the store queue, often resulting in additional penalties may be avoided, and thereby further improving performance.

In one embodiment, the guard word is obtained from the caller's stack after reading the return address from the stack to avoid leaving the return address unprotected for any time period. Conversely, if the guard word is obtained prior to reading the return address from memory, corruption of the return address occurring between the point in time when the guard word is read and the point in time when the return address is read may not be detected.

Figure 5A:
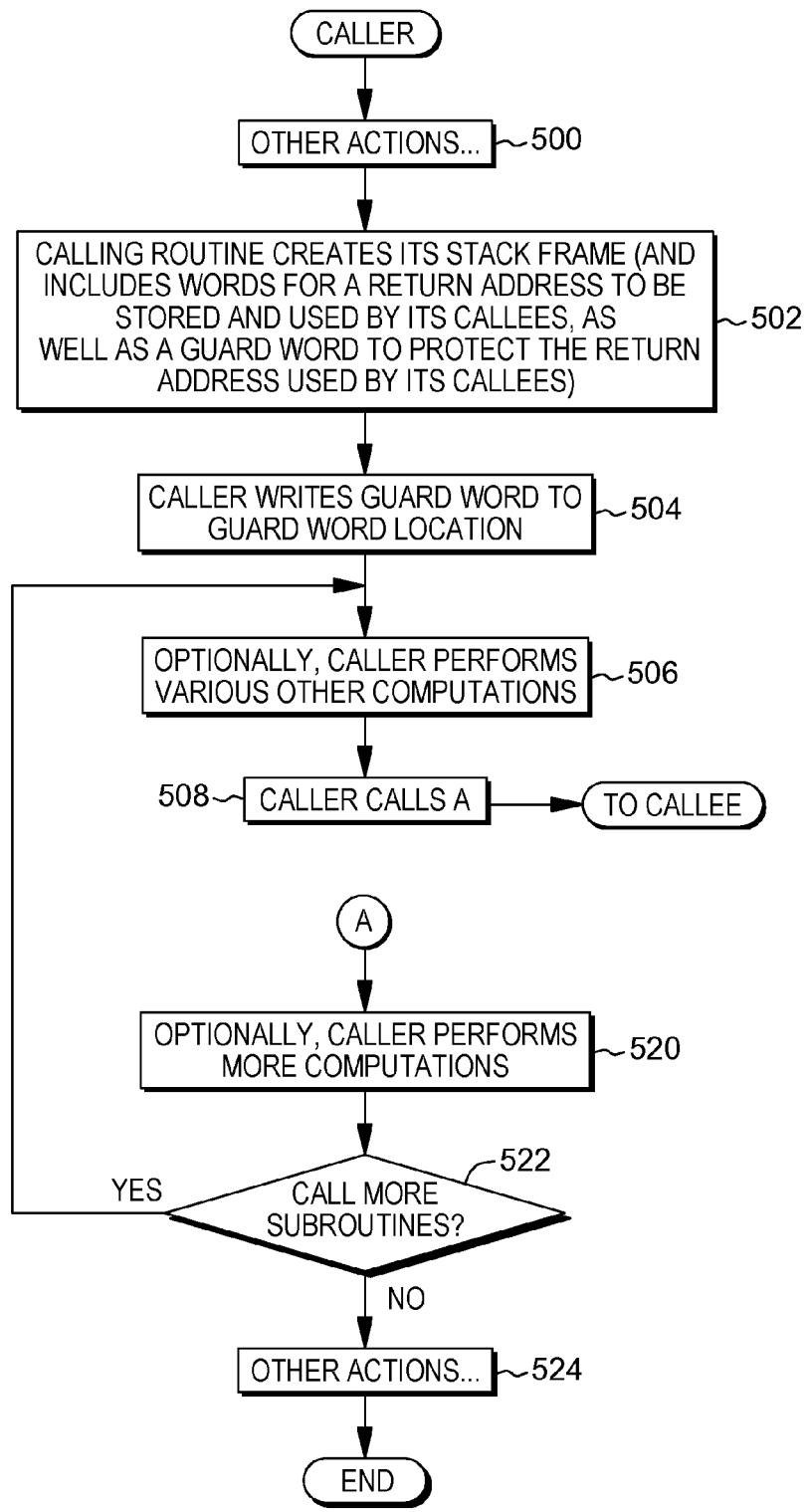
FIGS. 5A-5B depict one embodiment of logic to detect corruption of stacks, in accordance with an aspect of the present invention.

Further details relating to using a guard word for stack protection are described with reference to FIGS. 5A-5B. With reference to FIG. 5A, one embodiment of actions taken by a caller are described, and with reference to FIG. 5B, one embodiment of actions taken by a callee are described.

Referring to FIG. 5A, a caller routine may optionally perform one or more actions prior to creating a stack frame, STEP 500. The caller routine then creates its stack frame, STEP 502. This stack frame includes a space, e.g., one or more words, for a return address to be used by its callees, as well as one or more words for a guard word to protect the return address used by its callees. Further, the caller writes a guard word to the guard word location within the stack frame, STEP 504. Optionally, the caller performs other computations, STEP 506. The caller then calls a callee routine, in this example, STEP 508. Processing associated with the callee routine is described with reference to FIG. 5B.

Figure 5B:
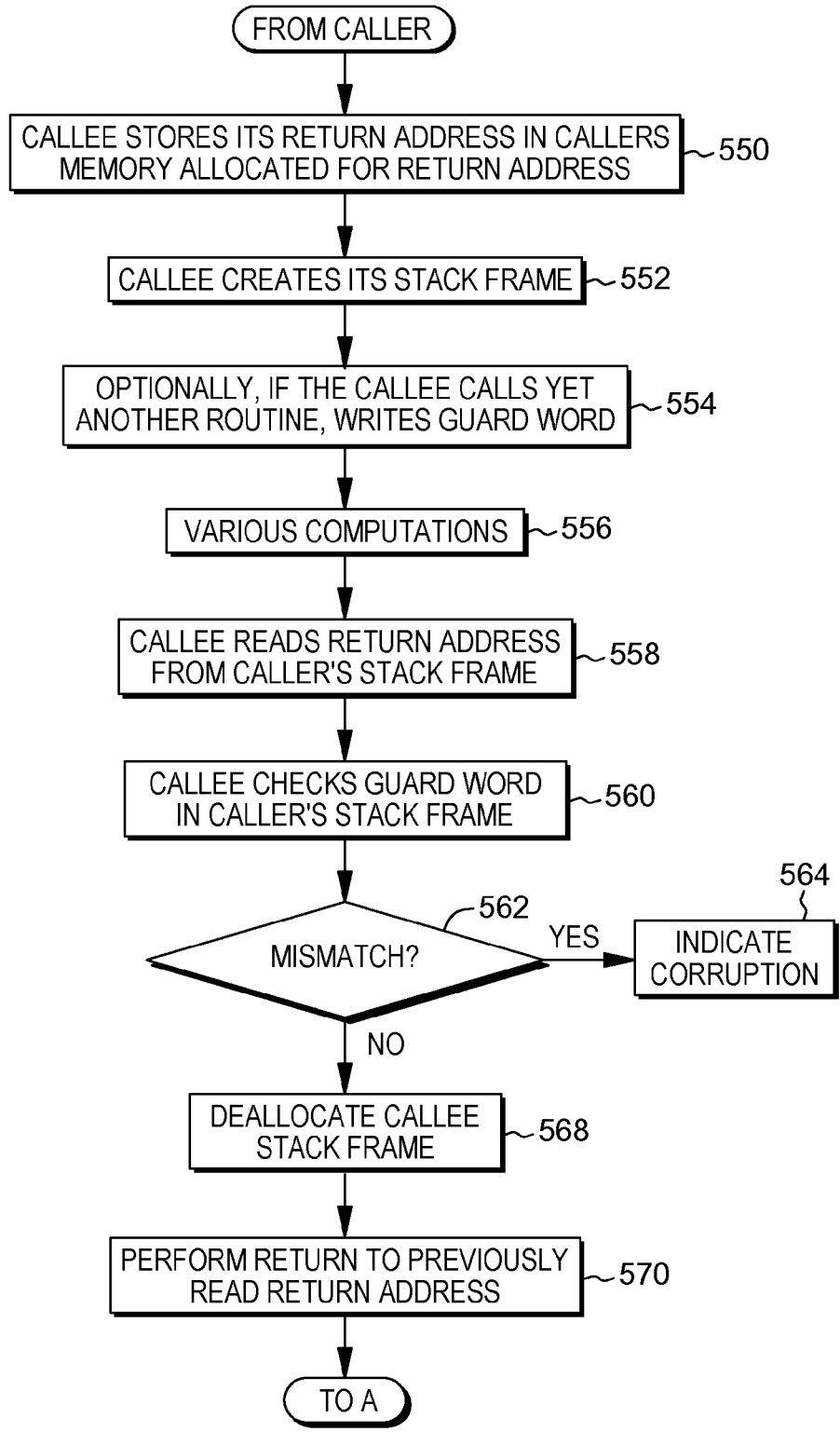

Referring to FIG. 5B, based on being called, the callee stores its return address in the caller's memory allocated for the return address, STEP 550. The called routine then creates its stack frame, which includes a space, e.g., one or more words, for a return address to be used by its callees, as well as one or more words for a guard word to protect the return address used by its callees, STEP 552. Optionally, if the callee calls a routine, it writes a guard word in its stack frame, STEP 554. The callee optionally performs other computations, STEP 556. The callee reads the return address from the caller's stack frame, STEP 558. Further, the callee checks the guard word in the caller's stack frame, STEP 560. A determination is made as to whether the guard word was as expected, INQUIRY 562. If the guard word was not the expected value, an indication of corruption is provided, STEP 564. Otherwise, the callee deallocates the callee's stack frame, STEP 568, and returns to the previously read return address, STEP 570.

Returning to FIG. 5A, the callee returns and the caller optionally performs one or more computations, STEP 520. A determination is made as to whether another routine is to be called, INQUIRY 522. If another routine is to be called, processing continues to STEP 506 or 508, as examples. Otherwise, one or more other actions may be performed, STEP 524. For instance, the caller may itself be a callee and is to perform the actions in FIG. 5B. Other examples are also possible.

One example of code to write a guard word, verify a guard word, and prevent the return to a corrupted return address is provided below (in one embodiment based on the z/Architecture instruction set architecture):

```
main:
# Prolog
STMG 11, 15, 88 (15)     # Save callers registers
LGR 1, 15                # Load stack pointer in GPR 1
AGHI 15,-160             # Allocate stack space
```

-continued

```
STG 1, 0(15)           # Store back chain
LG 2, <guardword>      # Obtain guard word reference value
STG 2, 8(r1)           # Store guard word to stack frame
# Prolog end
LARL 2, .LC0
LG 3, .LC2-.LT0_0(13)
BRASL 14, printf       # Example function call to printf
# Epilog
LG 4, 272(15)          # Load return address
LG 11, <guardword>     # Obtain guard word value
LG 4, 168 (r15)        # Obtain guard word in the stack frame
                         of caller
CRJNE 11, 3, corruption # Test for mismatch between actual
                         and reference
LGHI 2, 0
LMG 11, 15, 248(15)    # Restore registers
BR 4                   # Branch back to caller
# Epilog end
corruption:
abend
```

In the above code:

LG 2, <guardword> obtains the guard word reference value to be written to the present routine's stack frame to protect any called routine's return address called by the present routine. A variety of locations are contemplated for storing the reference guard word, such as a memory location, a control register, a special purpose register, a reserved general purpose register, and so forth.

STG 2, 8(r1) writes a guard word protecting any called routine's return address called by the present routine to the stack frame at an offset of 8 bytes from the stack point r1 (i.e., protects a return to this routine).

LG 11 <guardword> obtains the guard word reference value to which an actual guard word value protecting the return address should be compared.

LG 4, 168 (r15) obtains the guard word in the caller's stack frame protecting the present routine's return address.

CRJNE 11, 3, corruption verifies the guard word protecting this routine's return address prior to return (i.e., protect a return from this routine) by comparing the actual value in the caller's stack frame (register 11) to the expected (reference) value of the guard word (register 3) and branches to the code with the label corruption when they are not equal.

BR 4 a branch back to caller would branch to a corrupted address except the instruction "CRJNE 11, 3, corruption" protects against this.

Corruption abends abends (abnormally ends) the program, and may further invoke logging that corruption has occurred, as well as other defense mechanisms (e.g., operator notification, collect dump for analysis, etc.). In one embodiment, abend may be implemented using a trap instruction. A variety of other embodiments are contemplated, such as performing a system call, a library call, executing an illegal instruction, and so forth.

In a further embodiment, instead of one or more of the load and/or store instructions used above to load and check the guard word, one or more architectural facilities are provided to add further efficiencies. For instance, the architectural facilities include a guard word register to store a guard word; a Store Guard Word instruction to provide a memory location within the caller's stack in which the guard word is to be saved; and a Verify Guard Word instruction to verify the guard word's correctness, each of which is described below.

Figure 6:
FIG. 6 depicts one example of a guard word register, in accordance with an aspect of the present invention.

The guard word register may be a control register, a location in the hardware system area, or any other selected secure register. As depicted in FIG. 6, a guard word register 600 includes a value for a guard word 602 to be checked prior to return by a callee routine. In one example, the guard word register is initialized on a per-thread (or per-process) basis.

Figure 7:
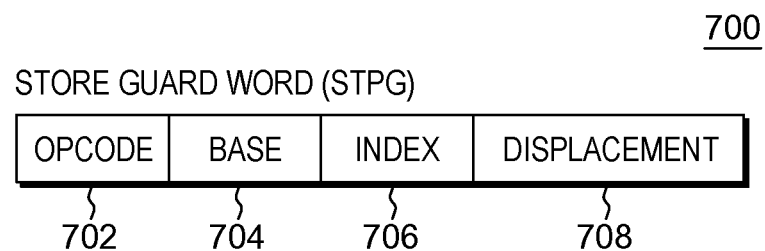
FIG. 7 depicts one example of a Store Guard Word instruction, in accordance with an aspect of the present invention.

One example of a Store Guard Word instruction is described with reference to FIG. 7. As shown, a Store Guard Word instruction (STPG) 700 includes at least one opcode field 702 indicating that this is a store guard word operation; a base register field 704 including a register that includes a base address; an index register field 706 including a register that includes an index address; and a displacement field 708 that includes a displacement value. In one example, the base address, the index address and the displacement value are added to provide a resultant address of a memory location, e.g., within the caller's stack frame.

In operation, the value of the guard word stored in the guard word register is written in the memory location indicated by the resultant address.

Figure 8:
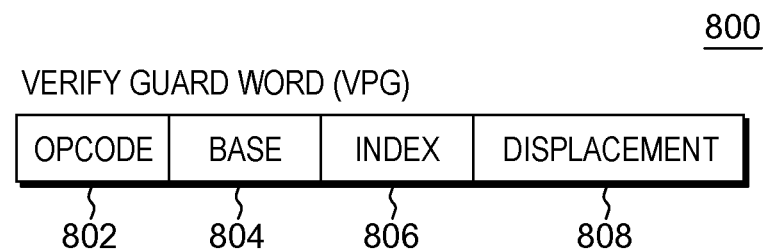
FIG. 8 depicts one example of a Verify Guard Word instruction, in accordance with an aspect of the present invention.

One example of a Verify Guard Word instruction is described with reference to FIG. 8. As shown, a Verify Guard Word instruction (VPG) 800 includes at least one opcode field 802 indicating that this is a verify guard word operation; a base register field 804 including a register that includes a base address; an index register field 806 including a register that includes an index address; and a displacement field 808 that includes a displacement value. In one example, the base address, the index address and the displacement value are added to provide a resultant address of a memory location, e.g., the address of the location within the caller's stack frame that includes the guard word.

In operation, the value at the specified memory location identified by the resultant address (i.e., the guard word in the caller's stack frame) is loaded into a location T, the obtained value at T is compared to the value in the guard word register, and if they are unequal, a notification event (e.g., a trap, an exception, an event based branch, or other notify action) is provided of a corrupt guard word. In one example, the application abnormally terminates.

One example of code using the architected facilities is described below (in one example of a z/Architecture instruction set architecture):

```
main:
# Prolog
STMG 11, 15, 88 (15)   # Save callers registers
LGR 1, 15              # Load stack pointer in GPR 1
AGHI 15,-160           # Allocate stack space
STG 1, 0(15)           # Store back chain
STPG 2, 8(r1)          # Store guard word to stack frame
# Prolog end
LARL 2, .LC0
LG 3, .LC2-.LT0_0(13)
BRASL 14, printf       # Example function call to printf
# Epilog
LG 4, 272(15)          # Load return address
VPG 168 (r15)          # Verify guard word
LGHI 2, 0
LMG 11, 15, 248(15)    # Restore registers
BR 4                   # Branch back to caller
# Epilog end
```

In the above code:

STPG 2 writes the guard word to protect any called routine's return address called by the present routine (i.e., protect returns to this routine).

VPG verifies the guard word protecting this routine's return address prior to return (i.e., protect return from this routine, and abend if the return address is not properly verified).

As described above, a guard word is placed in a caller's stack frame and is used by one or more callees to detect whether a return address has been overwritten. This detects corruption of the stack frame and prevents further corruption of data and/or programs. Additionally, the transfer of control to an undesired or unknown location is prevented.

In one or more aspects, hardware support for initialization and verification of the guard word is provided. A reference value for the guard word is stored, for instance, in a processor register or other resource not commonly attackable by a memory buffer overflow, such as in a control register, hardware system area or other processor resource. In one example, the resource is not directly accessible by a user application. The hardware support includes, for instance, a Store Guard Word instruction that provides an address in the caller's stack frame to which the guard word is to be saved; and a Verify Guard Word instruction that loads the guard word and verifies its correctness. If it is not correct, a processor notification is performed, an application may be quarantined and/or the application may be abnormally terminated. By using the architected Store and Verify instructions, efficiencies may be achieved by needing fewer instructions and processing.

In accordance with one or more further aspects, modules (e.g., one or more routine) or routines that may be linked to one another, e.g., by being called by a routine or otherwise, may have differing protection capabilities. For instance, a caller routine may support the guard word protection facility, but one or more of the routines called by the caller may not support the guard word protection facility, or vice versa. This may cause problems, e.g., when the caller program is expecting an action not performed by the callee routine or vice versa. Thus, in accordance with an aspect of the present invention, one or more features are provided that allow routines or modules of differing protection capabilities to be linked without failing.

As one example, one feature includes using a protection guard enablement indicator to indicate whether the guard word facility is to be used. As one example, a protection guard enablement indicator is provided for each software thread (or process or application, or in a single threaded core, a core). The protection guard enablement indicator is provided in the context switch information accessed by an operating system; or hypervisor or other virtual machine manager in a computing environment including logical partitions and/or virtual machines.

Based on a module loader recognizing that at least one routine which is not protected is loaded (as indicated by a protection indicator for the routine, or for a module containing the routine), the protection guard enablement indicator is set to disable guard protection use. In a further embodiment, a dynamic linker may recognize this situation, and disable the guard protection use, if it is to be disabled. Further details relating to the use of the protection guard enablement indicator are described with reference to FIGS. 9-10.

Figure 9:
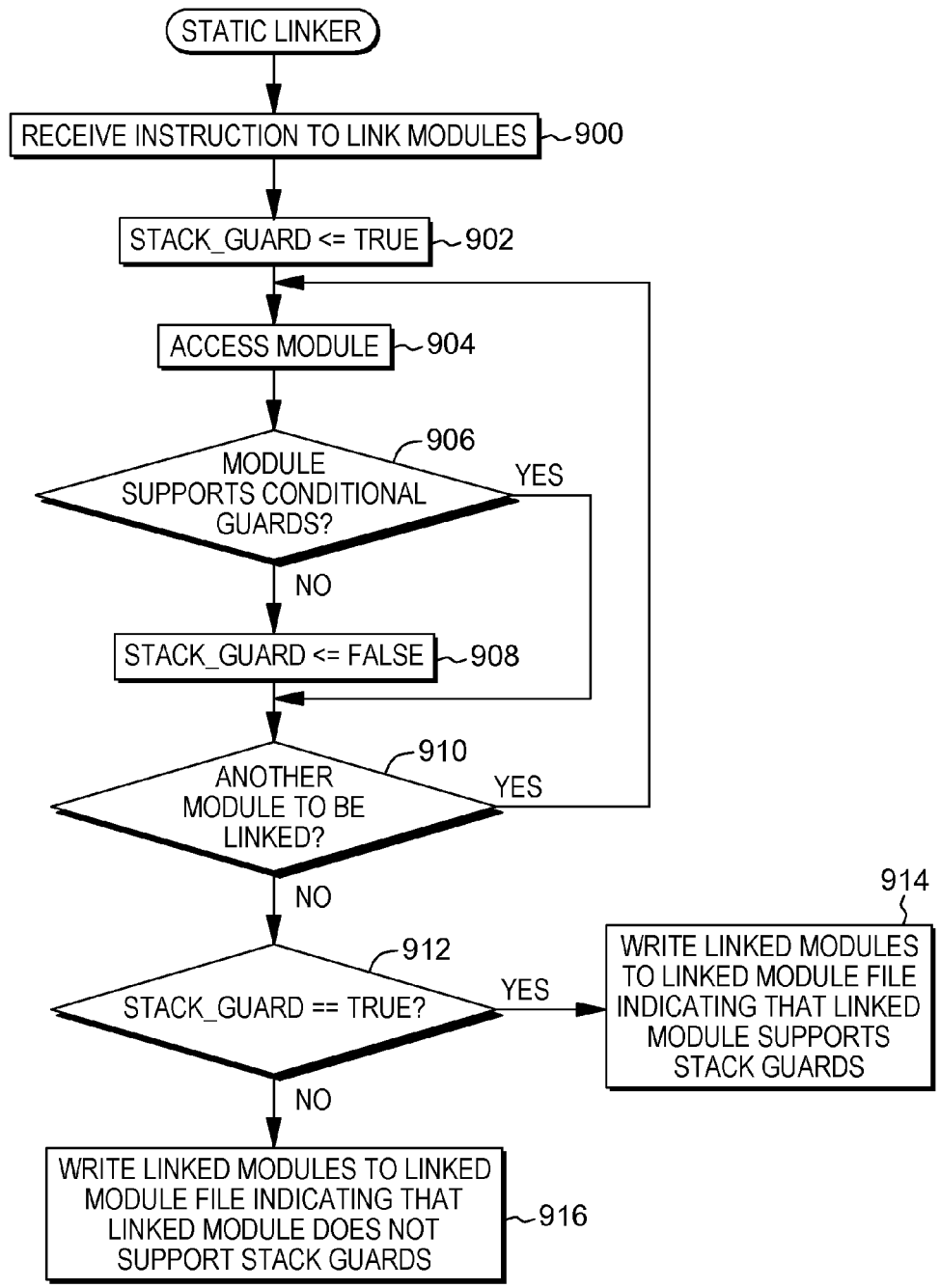
FIG. 9 depicts one example of logic of a static linker, in accordance with an aspect of the present invention.

With reference to FIG. 9, processing associated with a static linker is described. This processing may be performed in conjunction with other processing typically performed by a linker. In one example, the first module is, e.g., the main program. In another embodiment, each routine is a module, and the stack guard support is indicated on a per-routine basis.

Referring to FIG. 9, a static linker executing within a processor receives an instruction to link modules (a module includes one or more routines, in one embodiment), STEP 900. Based thereon, a variable referred to as stack_guard is set equal to true, STEP 902. A module, such as a first module, is accessed, STEP 904, and a determination is made as to whether this module supports stack guard protection (also referred to herein as conditional guards), INQUIRY 906. This is determined, for instance, based on a protection indicator associated with the module. This protection indicator may be stored in a memory location or a file location associated with the module, as examples.

If the protection indicator is set, e.g., to one, then the module supports stack guard protection. However, if it is not set, e.g. is equal to zero, then the module does not support stack guard protection. If the module does not support stack guard protection, then stack_guard is set to false, STEP 908.

Thereafter, or if the module does support stack guard protection, then a determination is made as to whether another module is to be linked, INQUIRY 910. If so, processing continues to STEP 904. Otherwise, a check is made of the value of stack_guard, INQUIRY 912. If stack_guard is set to true, then the linked modules are written to a linked module file as a linked module and indicating that the linked module supports stack guards, STEP 914. However, if stack_guard is set to false, then the linked modules are written to the linked module file as a linked module and indicating that the linked module does not support stack guards, STEP 916. This allows the modules to be processed even though they have differing protection capabilities. They either are executed in accordance with stack guard protection if the modules support such protection, or are executed without this protection, if one or more of the modules do not support stack guard protection.

Figure 10:
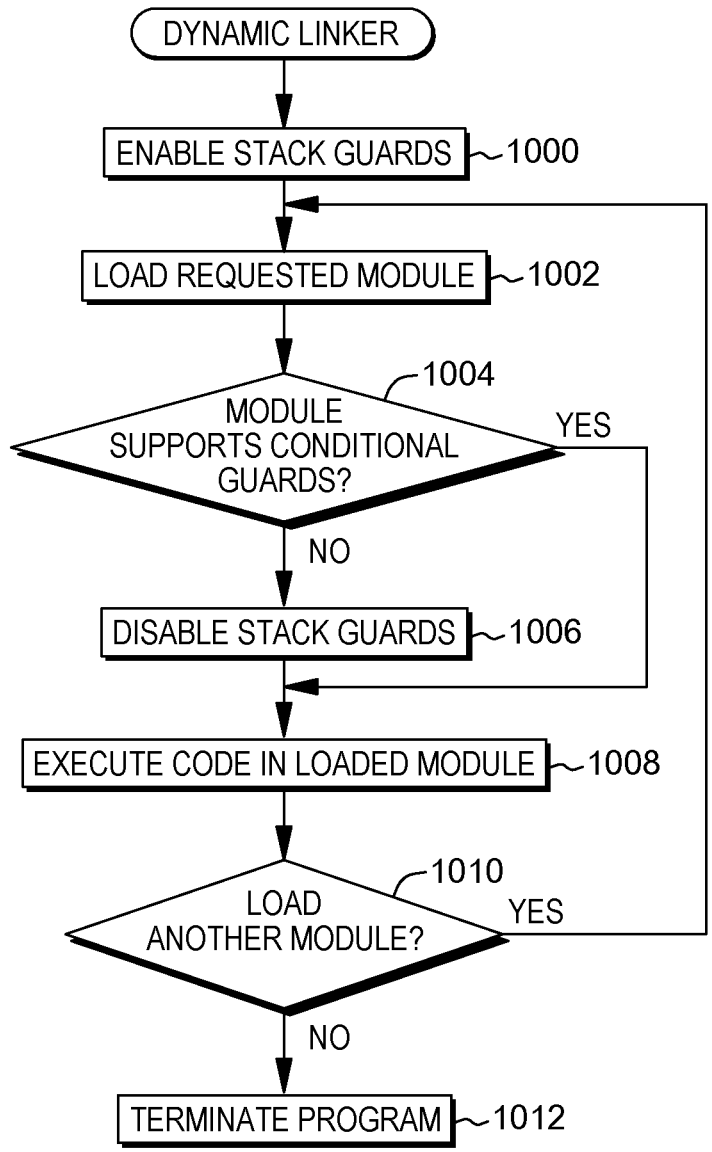
FIG. 10 depicts one example of logic of a dynamic linker, in accordance with an aspect of the present invention.

With reference to FIG. 10, processing associated with a dynamic linker is described. This processing may be performed in conjunction with other processing typically performed by a linker. Modules processed by the dynamic linker may correspond to modules statically linked, as described above.

Referring to FIG. 10, an indicator referred to as a protection guard enablement indicator is set (e.g., to one) to specify stack guards are enabled, STEP 1000. A requested module is loaded, STEP 1002, and a determination is made as to whether the loaded module supports stack guard protection, INQUIRY 1004. For instance, the module's protection indicator is checked to determine if it is set to enabled. If the loaded module does not support stack guard protection, then the protection guard enablement indicator is reset (e.g., set to zero) to indicate that stack guards are to be disabled, STEP 1006. Thereafter, or if the module supports stack guard protection, the code in the loaded module is executed, STEP 1008. Again, either the module is executed with stack guard protection, based on the module supporting this protection, or is executed without stack guard protection, based on the module not supporting stack guard protection.

Further, a determination is made as to whether another module is to be loaded, INQUIRY 1010. If not, the program terminates, STEP 1012. Otherwise, processing continues with STEP 1002.

With the above logic, when at least one module of a plurality of modules to be linked does not support stack guard protection, then stack guard protection is not used. Thus, in one example, verification of the guard word may be suppressed, and in a further aspect, the storing of the guard word may also be suppressed.

To facilitate suppressing the storing of the guard word and/or verifying the guard word in selected situations, such as one or more of the routines or modules does not support stack guard protection, variants of the Store Guard Word and Verify Guard Word instructions are provided that include conditional logic to check whether stack guard protection is to be used. These instructions are referred to as a Store Guard Word Conditional (STPGC) instruction and a Verify Guard Word Conditional (VPGC) instruction, respectively. Each of these instructions has a format similar to the Store Guard Word or Verify Guard Word instruction, respectively, except the opcode would be different indicating whether or not the conditional logic is included.

In one embodiment, with the Store Guard Word Conditional instruction, the guard word is stored in the specified memory location in the caller's call stack frame, if the protection guard enablement indicator is enabled; and for the Verify Guard Word instruction, the verification is performed, if the protection guard enablement indicator is enabled. In one example, the check of the protection guard enablement indicator is implemented in the instruction decode unit of the processor. In such an embodiment, if the protection guard enablement indicator indicates that the protection guard facility is not to be used, the instruction decode logic may translate the instruction to a no-operation (NOP) instruction, or completely omit it from the stream of decoded instructions.

Figure 11:
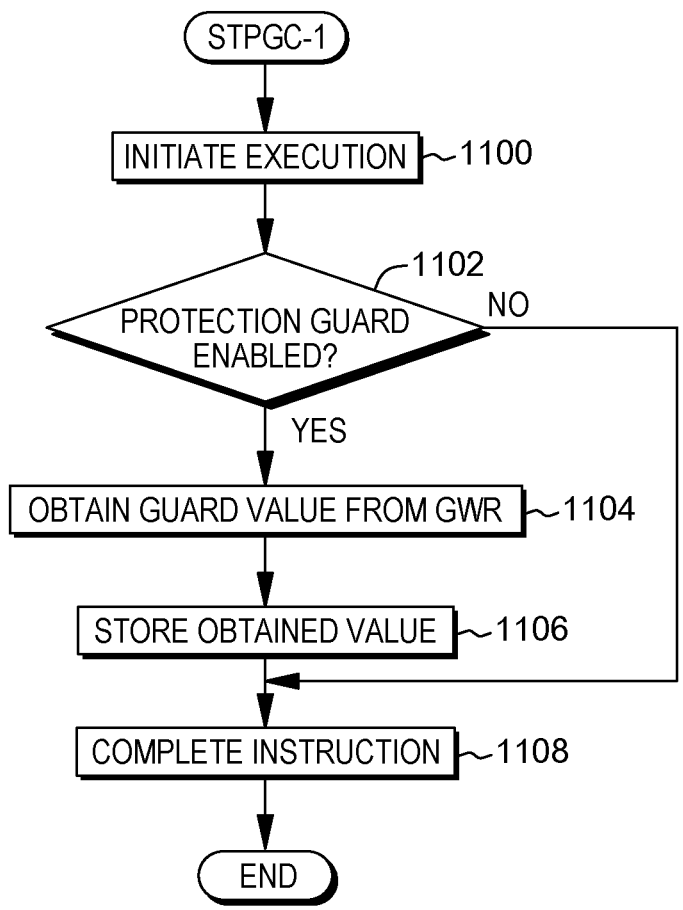
FIG. 11 depicts one example of logic of a Store Guard Word Conditional instruction, in accordance with an aspect of the present invention.

Further details relating to the Store Guard Word Conditional instruction are described with reference to FIG. 11. In one embodiment, based on initiating execution of the Store Guard Word Conditional instruction, STEP 1100, a determination is made as to whether the protection guard enablement indicator is enabled, INQUIRY 1102. If it is enabled, then the guard word value is obtained from the guard word register, STEP 1104, and stored in the memory location, specified by the resultant address of the STPGC, in the caller's stack frame, STEP 1106. The instruction then completes, STEP 1108. Otherwise, if the protection guard enablement indicator is not enabled, then the instruction completes without obtaining the guard word value or storing it in the caller's stack frame, STEP 1108.

Figure 12:
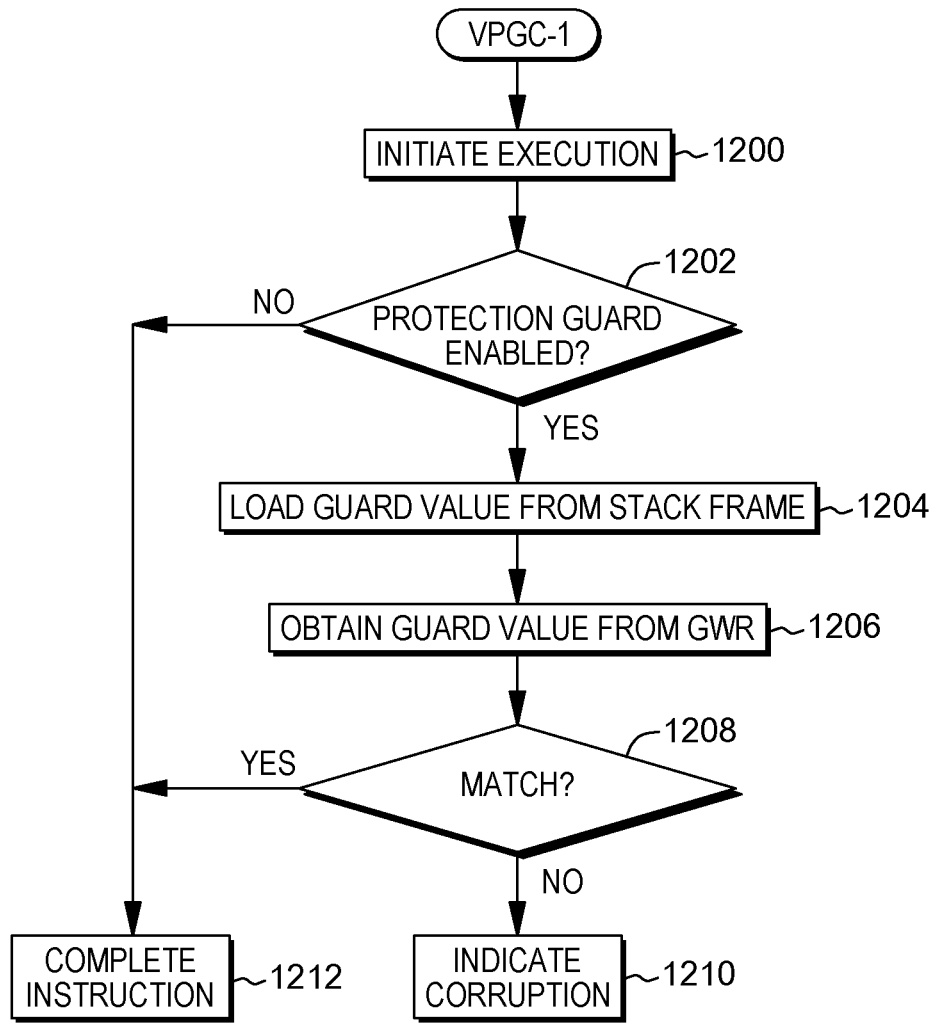
FIG. 12 depicts one example of logic of a Verify Guard Word Conditional instruction, in accordance with an aspect of the present invention.

Likewise, further details relating to the Verify Guard Word Conditional instruction are described with reference to FIG. 12. In one embodiment, based on initiating execution of the Verify Guard Word Conditional instruction, STEP 1200, a determination is made as to whether the protection guard enablement indicator is enabled, INQUIRY 1202. If it is enabled, then the guard word is loaded from the stack frame, STEP 1204, and the guard word value is obtained from the guard word register, STEP 1206. The guard words are compared, and if there is a mismatch, INQUIRY 1208, then an indication is provided of corruption, STEP 1210. Otherwise, the instruction completes, STEP 1212.

However, if the protection guard enablement indicator is disabled, INQUIRY 1202, the instruction completes without loading or obtaining the guard word or performing the compare, STEP 1212.

One example of code using the conditional store and verify instructions is described below (in one example of a z/Architecture instruction set architecture):

```
main:
# Prolog
STMG 11, 15, 88 (15)      # Save callers registers
LGR 1, 15                 # Load stack pointer in GPR 1
AGHI 15,-160              # Allocate stack space
STG 1, 0(15)              # Store back chain
STPGC 2, 8(r1)            # Conditionally store guard word to
                            stack frame
# Prolog end
LARL 2, .LC0
LG 3, .LC2-.LT0_0(13)
BRASL 14, printf          # Example function call to printf
# Epilog
LG 4, 272(15)             # Load return address
VPGC 168 (r15)            # Conditionally verify guard word
LGHI 2, 0
LMG 11, 15, 248(15)       # Restore registers
BR 4                      # Branch back to caller
Epilog end printf:
Prolog
STMG 11, 15, 88 (15)      #Save callers registers
LGR 1, 15                 # Load stack pointer in GPR 1
AGHI 15,-160              # Allocate stack space
STG 1, 0 (15)             # Store back chain
STPGC 2, 8(r1)            # Conditionally store guard word to
                            stack frame

# Epilog
LG 4, 272(15)             # Load return address
VPGC 168 (r15)            # Conditionally verify guard word
LGHI 2, 0
LMG 11, 15, 248(15)       # Restore registers
BR 4                      # Branch back to caller
Epilog end
```

In the example code above, both the main module and printf are enabled for stack guard protection, and therefore, processing will include the stack guard protection. However, in the example code below, the main module does not support the stack guard protection, but printf does. Thus, processing will be performed without the stack guard protection.

```
main:
# Prolog
STMG 11, 15, 88 (15)      # Save callers registers
LGR 1, 15                 # Load stack pointer in GPR 1
AGHI 15,-160              # Allocate stack space
STG 1, 0(15)              # Store back chain
# No protection guard enabled
# Prolog end
LARL 2, .LC0
LG 3, .LC2-.LT0_0(13)
BRASL 14, printf          # Example function call to printf
# Epilog
LG 4, 272(15)             # Load return address
# No protection guard enabled
LGHI 2, 0
LMG 11, 15, 248(15)       # Restore registers
BR 4                      # Branch back to caller
Epilog end printf:
Prolog
STMG 11, 15, 88 (15)      # Save callers registers
LGR 1, 15                 # Load stack pointer in GPR 1
AGHI 15,-160              # Allocate stack space
STG 1, 0 (15)             # Store back chain
STPGC 2, 8(r1)            # Conditionally store guard word to
                            stack frame

# Epilog
```

-continued

```
LG 4, 272(15)          # Load return address
VPGC 168 (r15)         # Conditionally verify guard word
LGHI 2, 0
LMG 11, 15, 248(15)    # Restore registers
BR 4                   # Branch back to caller
# Epilog end
```

Described above is one example of interlinking modules with differing protection capabilities. A module loader, as an example, accesses a module indicator to determine whether the module to be loaded is enabled for guard word protection. Based on the module not being enabled for guard word protection, a protection guard enablement indicator is set to disable guard word protection for all of the interlinked modules associated with this module. Further, in one embodiment, a warning is issued or a log is written indicating that an unprotected module is being loaded. In yet a further embodiment, a configuration value causes an unprotected module not to be loaded, and the application remains protected. In this embodiment, the application/supervisor software may further receive a warning about the attempt to load the unprotected module.

Figure 13:
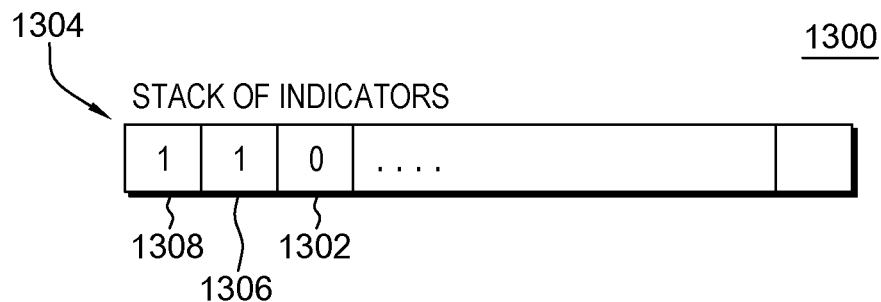
FIG. 13 depicts one example of a stack of indicators used in accordance with an aspect of the present invention.

In another example, instead of using the protection guard enablement indicator, a per-routine indication, implemented, for instance, as a stack of indicators, is used. In one example, as shown in FIG. 13, a stack 1300 may be a single bit shift register initialized to zero 1302. When a routine stores a guard word on its stack frame, it sets the indicator (e.g., to one) at the top of the stack 1304 to indicate that the routine has provided a protection guard word in its stack frame. When a routine is called, a new indicator is provided at the top of the stack. This may be achieved by shifting the shift register by one bit, indicating the presence of a new routine. When a routine returns, the shift register is shifted in the opposite direction.

Thus, in the examples above with the main routine and printf, based on the main routine storing a guard word on its stack frame, the main routine sets an indicator 1306 on the stack (which would be at the top of the stack at the time of setting the indicator). Similarly, when printf stores a guard word on its stack frame, it also sets an indicator 1308.

Since the stack is of a defined size, if necessary, any shifted out indicators may be stored in backup storage. If no backup storage is used, then those routines for which indicators may have been shifted out may be executed without guard word protection. This is achieved, e.g., by shifting in an indicator value indicating that no check should be performed since the protection status is undetermined.

In yet a further embodiment, if it is known that all of the routines have stack guard protection (e.g., by performing the techniques described herein, then the facility is configured to load '1', or a single bit indicator is used causing guard word protection to occur regardless of the stack indicators.

In the stack indicators example, the Store Guard Word Conditional and Verify Guard Word Conditional instructions may be used, but the logic is a bit different. In this example, instead of the condition being based on the guard word protection enablement indicator, the condition is based on a value of a stack indicator.

For instance, in this example, the Store Guard Word Conditional instruction stores the guard word in the caller's stack frame, and then sets the stack indicator to e.g., one (indicator (TOS) is set to true, where TOS is top of stack)). One embodiment of logic associated with this example of the Store Guard Word Conditional instruction, referred to as STPGC-2, is described with reference to FIG. 14.

Figure 14:
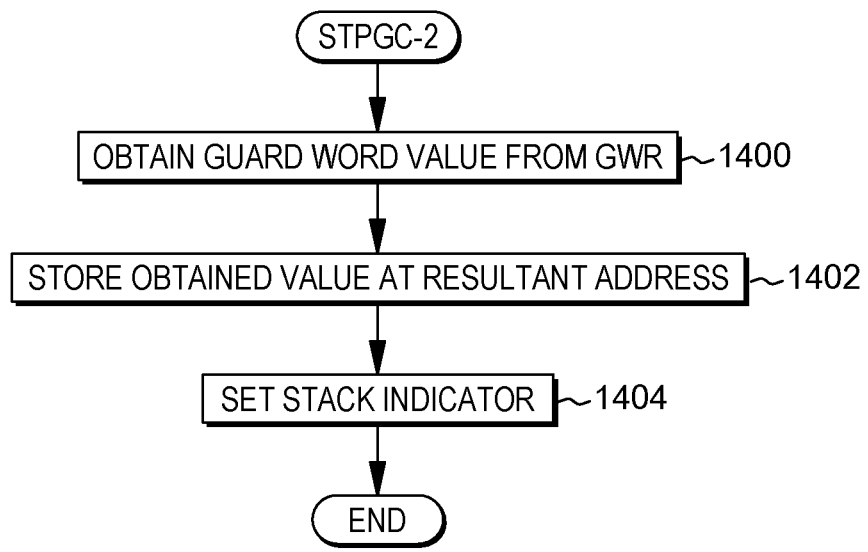
FIG. 14 depicts another example of logic of a Store Guard Word Conditional instruction, in accordance with an aspect of the present invention.

Referring to FIG. 14, in one embodiment, based on executing the STPGC-2 instruction, the guard word value is obtained from the guard word register, STEP 1400. That obtained value is then stored in the caller's stack frame at the resultant address of the instruction (e.g., value of base address, index address plus displacement), STEP 1402. Then, in this embodiment, an indicator in the indicator stack is set (e.g., indicator at TOS is set to one), STEP 1404.

Further, in one example, the Verify Guard Word Conditional instruction verifies the guard word if the selected indicator indicates guard word protection (verify if indicator (TOS+1) is true). One embodiment of logic associated with this example of the Verify Guard Word Conditional instruction, referred to as VPGC-2, is described with reference to FIG. 15.

Figure 15:
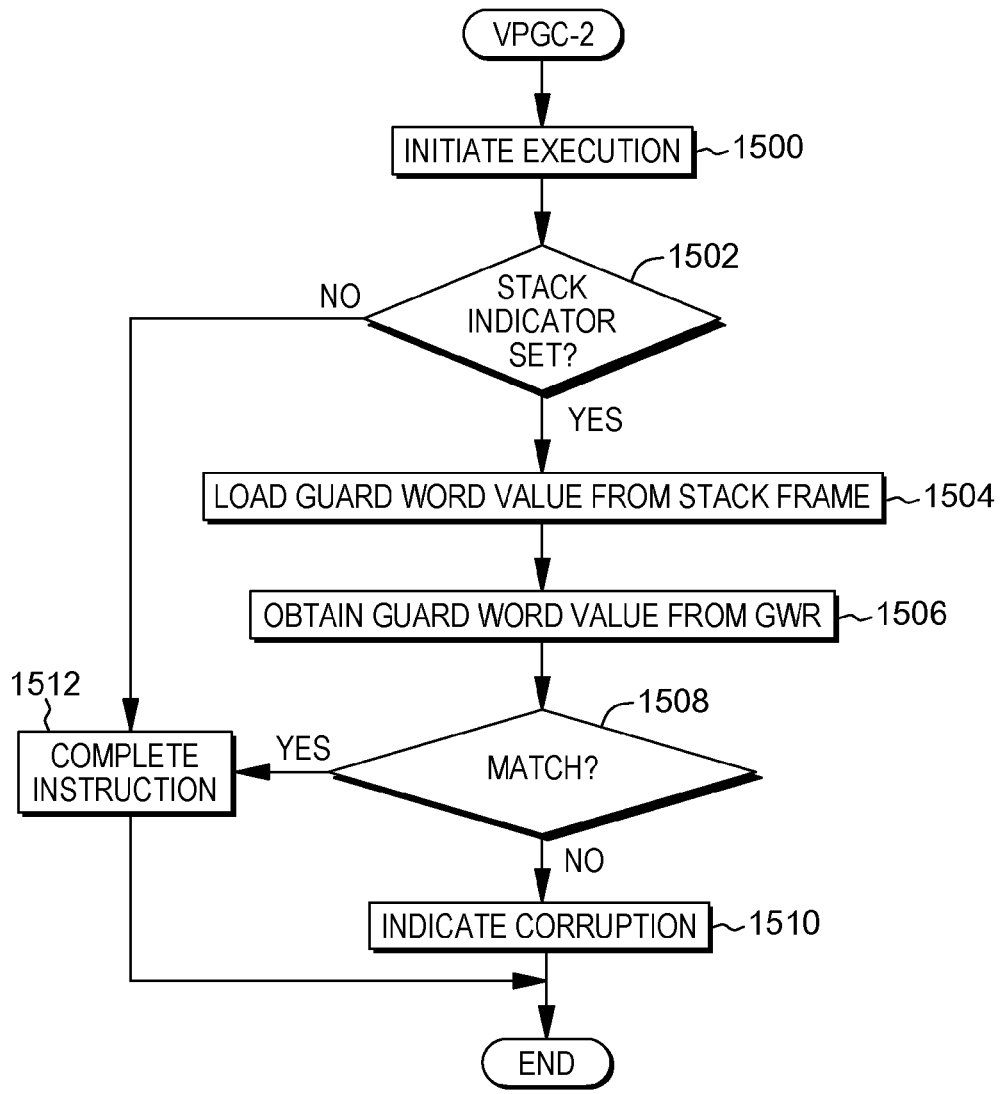
FIG. 15 depicts another example of logic of a Verify Guard Word Conditional instruction, in accordance with an aspect of the present invention.

Referring to FIG. 15, in one embodiment, execution of the instruction is initiated, STEP 1500, and a determination is made as to whether the stack indicator at the position of the stack (TOS+1) is equal to one, INQUIRY 1502. If it is, the guard word value is loaded from the stack frame, STEP 1504, and the guard word value is obtained from the guard word register, STEP 1506. If there is not a match, INQUIRY 1508, then corruption is indicated, STEP 1510. Otherwise, if there is a match or if the stack indicator is not set, then the instruction is completed, STEP 1512.

The above allows the interlinking of modules or routines with or without differing protection capabilities. In one embodiment, the indicator is on a per-routine basis. A push down stack is provided that tracks for each routine level whether its stack has been protected by its caller. A call subroutine allocates a new entry on the stack, and initializes the entry to unprotected. A Store Guard Word instruction or other store protection word instruction is executed by the call subroutine that concurrently updates the push down stack to indicate that stack protection has been enabled for the routine's callees. When the stack has been protected by a caller, the callee executes a Verify Guard Word instruction or other verify protection word instruction to verify the guard word. Otherwise, verification is suppressed, in one example.

In a further aspect, the interlinking of modules with or without differing protection capabilities is facilitated by the use of a protection guard enablement indicator. Further details relating to linking of modules are described with reference to FIGS. 16A-16B.

Figure 16A:
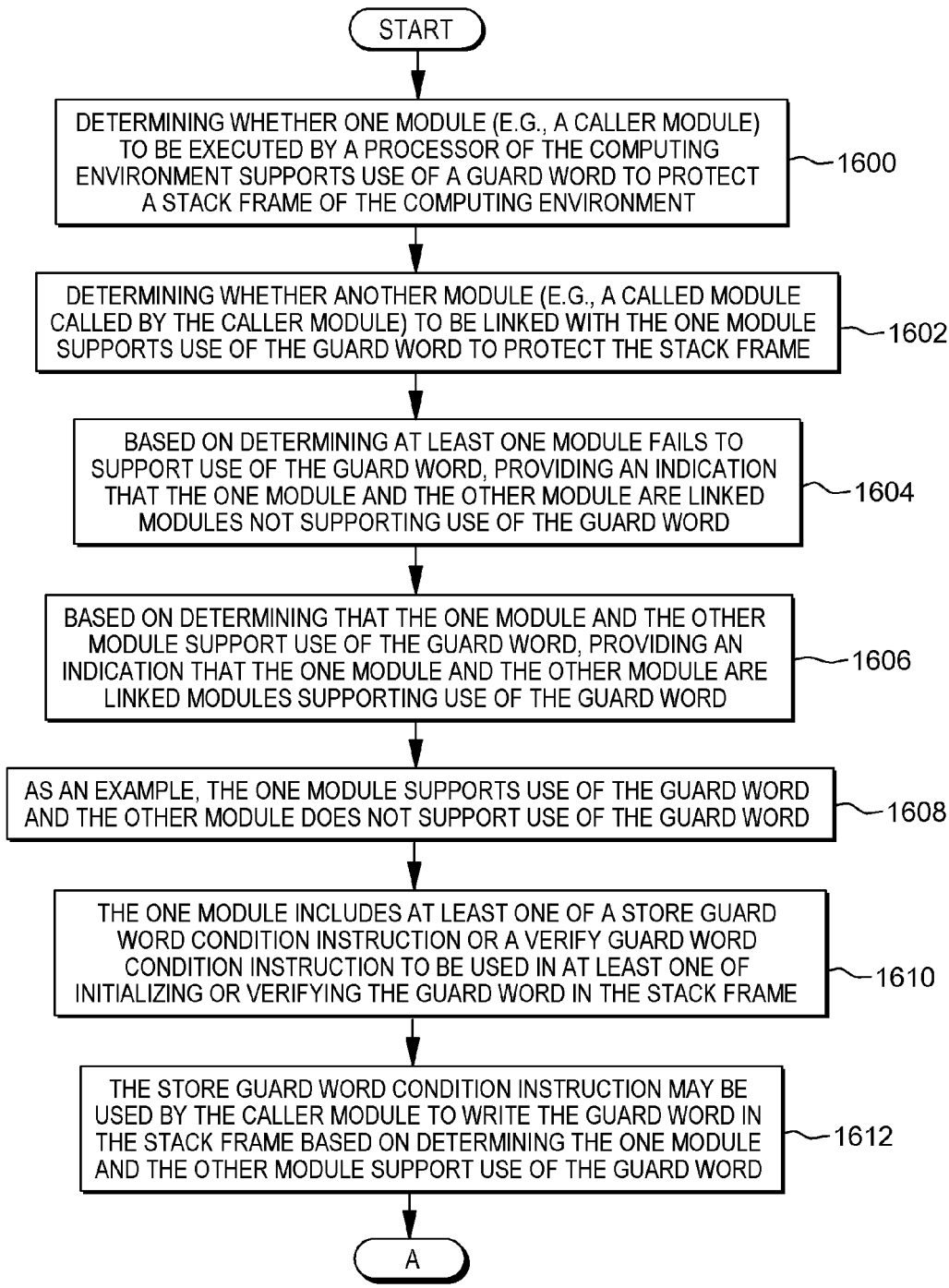
FIGS. 16A-16B depict one example of logic relating to interlinked modules of differing protection capabilities, in accordance with an aspect of the present invention.

Referring to FIG. 16A, a determination is made as to whether one module (e.g., a caller module) to be executed by a processor of the computing environment supports use of a guard word to protect a stack frame of the computing environment, STEP 1600. A further determination is made as to whether another module (e.g., a called module called by the caller module) to be linked with the one module supports use of the guard word to protect the stack frame, STEP 1602.

Based on determining that at least one of the one module and the other module fails to support use of the guard word to protect the stack frame, an indication is provided that the one module and the other module are linked modules not supporting use of the guard word, STEP 1604.

Based on determining that the one module and the other module support use of the guard word, an indication is provided that the one module and the other module are linked modules supporting use of the guard word, STEP 1606.

In one example, the one module supports use of the guard word and the other module does not support use of the guard word, STEP 1608. Further, the one module includes at least one of a store guard word condition instruction or a verify guard word condition instruction to be used in at least one of initializing or verifying the guard word in the stack frame, STEP 1610.

The store guard word condition instruction may be used by the caller module to write the guard word in the stack frame based on determining the one module and the other module support use of the guard word, STEP 1612.

Figure 16B:
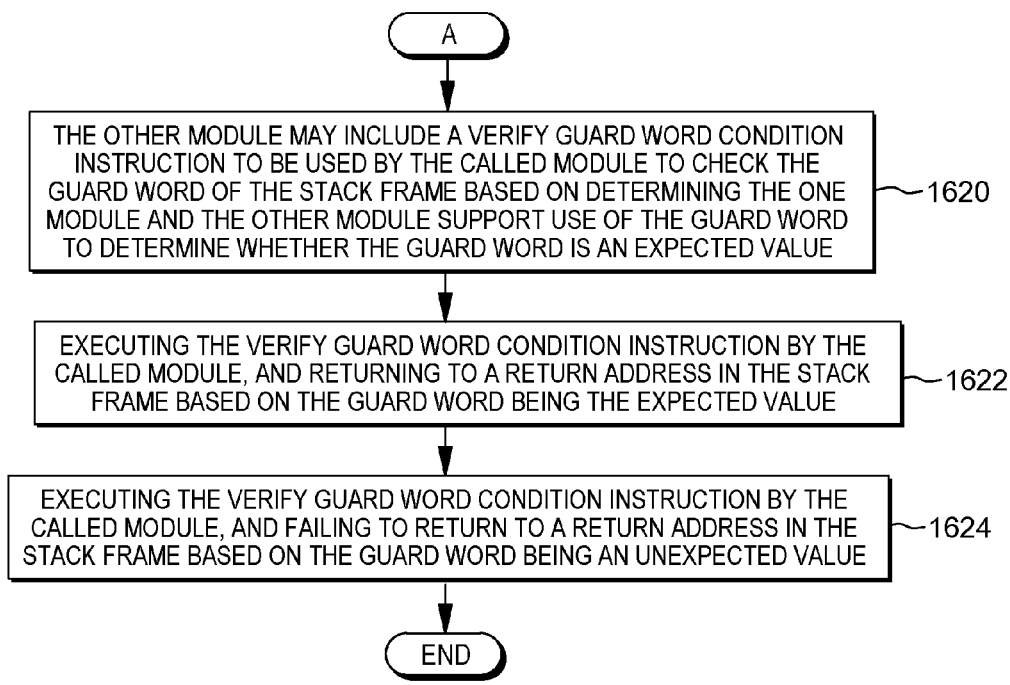

Referring to FIG. 16B, the other module may include a verify guard word condition instruction to be used by the called module to check the guard word of the stack frame based on determining the one module and the other module support use of the guard word to determine whether the guard word is an expected value, STEP 1620.

The verify guard word condition instruction is executed by the called module, and based on the guard word being the expected value, there is a return to a return address in the stack frame, STEP 1622, or based on the guard word being an unexpected value, failing to return to a return address in the stack frame, STEP 1624.

Although examples are described herein, other embodiments are possible. For instance, in one embodiment, guard words may not be allocated in leaf functions, which further reduces overhead of performing writes; and a guard word may not be checked if a return address was not stored in the stack frame, thereby reducing the overhead of checking.

In at least one embodiment, the guard word includes a "\0" character (or other appropriate terminator), further ensuring that most overflows would terminate due to a termination character. This avoids overflow attacks with most vulnerable (string) functions if a guard character is reconstructed, because overwriting the guard character "correctly" would implicitly terminate an overwrite attack at that point.

In one embodiment, the guard word is randomized during every execution, and initialized by the operating system when a new program is executed.

Yet further, the guard word may be written in a routine's prolog when allocating a stack, or it may be written prior to a first call, avoiding guard word stores when no call is performed. Other examples are also possible. Even further, the guard word is placed using a technique that identifies a first location in a subroutine, in accordance with an architecture, to place the guard word.

The guard word is allocated in the caller's stack. For instance, a return address is allocated for the callee in the caller's stack frame, and separated by a caller-provided guard word. The guard word is at a defined location, and has a defined value. The location is verified by the callee to have the defined value prior to effecting a routine's return (e.g., when a return address has been stored in memory) to ensure corruption has not occurred. Prior to a routine's return, the guard word is checked. If corruption is detected, the program is terminated and/or the operating system is notified to take additional actions against intrusion.

In yet a further aspect, a variant of the Store Guard Word instruction may be a Push Guard Word (PUSHGWR) instruction that allocates a new word on the stack by, for example, subtracting the size of the word from the stack and storing the guard word in the newly allocated space on the stack.

In a further aspect, stack protection may be disabled by a programmer, operator, supervisor user and/or other agent. In yet another embodiment, the protection may be disabled based on system load or based on other selected criteria.

In yet a further aspect, the guard word may be stored in a location associated with the caller's stack frame, but not necessarily within the stack frame. In this aspect, the caller still provides the guard word, which is checked by one or more callees before returning.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 1. Computer system/server 102 of FIG. 1 may be practiced in distributed cloud computing environments where tasks are performed by remote processing devices that are linked through a communications network. In a distributed cloud computing environment, program modules may be located in both local and remote computer system storage media including memory storage devices. Computer system/server 102 is capable of being implemented and/or performing any of the functionality set forth hereinabove.

Figure 17:
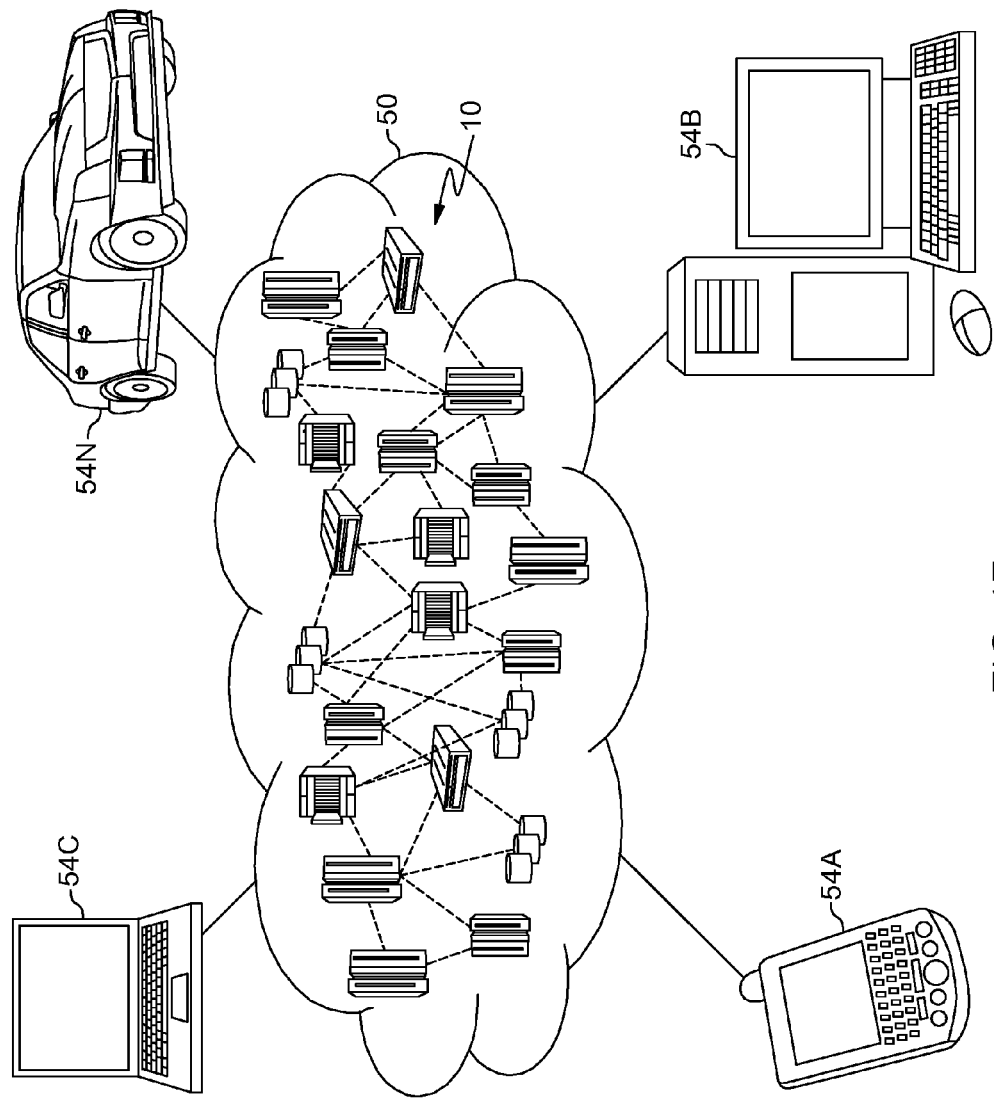
FIG. 17 depicts one embodiment of a cloud computing environment.

Referring now to FIG. 17, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 18:
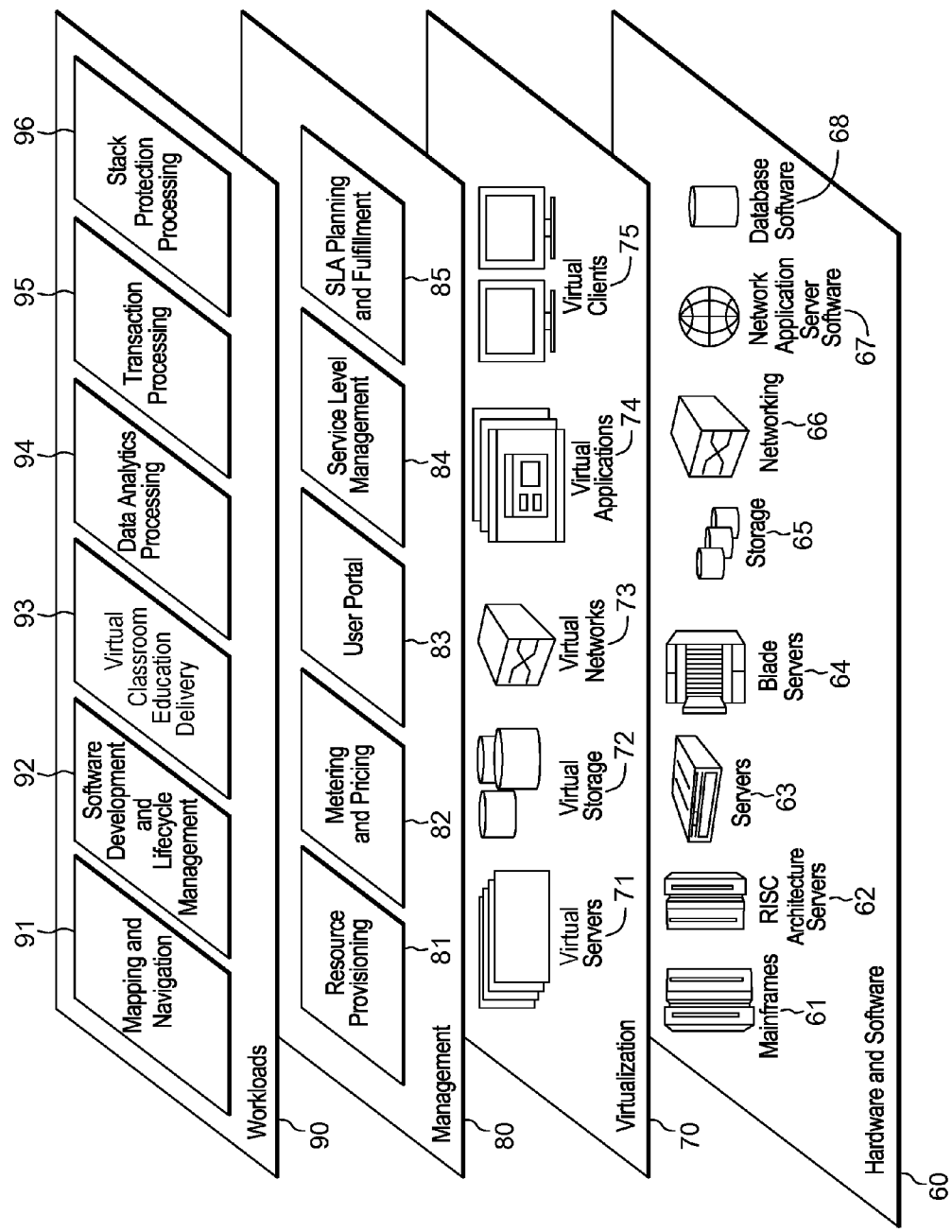
FIG. 18 depicts one example of abstraction model layers.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and stack protection processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different types of guard words may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating linking of modules of a computing environment, said computer program product comprising:
   a computer readable storage medium readable by a processing circuit and storing instructions for execution by the processing circuit for performing a method comprising:
      determining whether one module to be executed by a processor of the computing environment supports use of a guard word to protect a stack frame of the computing environment;
      determining whether another module to be linked with the one module supports use of the guard word to protect the stack frame;

based on determining that at least one of the one module and the other module fails to support use of the guard word to protect the stack frame, providing an indication that the one module and the other module are linked modules not supporting use of the guard word; and based on the indication, processing the one module and the other module without use of the guard word to protect the stack frame, wherein the one module is a caller module and the other module is a called module called by the caller module, and wherein the one module includes a store guard word condition instruction to be used by the caller module to write the guard word in the stack frame based on determining that the one module and the other module support use of the guard word, and wherein the other module includes a verify guard word condition instruction to be used by the called module to check the guard word of the stack frame based on determining that the one module and the other module support use of the guard word to determine whether the guard word is an expected value.

2. The computer program product of claim 1, wherein the one module includes a verify guard word condition instruction to be used in at least one of initializing or verifying the guard word in the stack frame.

3. The computer program product of claim 1, wherein the method further comprises based on determining that the one module and the other module support use of the guard word, providing an indication that the one module and the other module are linked modules supporting use of the guard word.

4. The computer program product of claim 1, wherein the method further comprises executing the verify guard word condition instruction by the called module, and returning to a return address in the stack frame based on the guard word being the expected value.

5. The computer program product of claim 1, wherein the method further comprises executing the verify guard word condition instruction by the called module, and failing to return to a return address in the stack frame based on the guard word being an unexpected value.

6. A computer system for facilitating linking of modules of a computing environment, said computer system comprising:
  a memory; and
  a processor in communication with the memory, wherein the computer system is configured to perform a method, said method comprising:
    determining whether one module to be executed by a processor of the computing environment supports use of a guard word to protect a stack frame of the computing environment;
    determining whether another module to be linked with the one module supports use of the guard word to protect the stack frame; and
    based on determining that at least one of the one module and the other module fails to support use of the guard word to protect the stack frame, providing an indication that the one module and the other module are linked modules not supporting use of the guard word; and
    based on the indication, processing the one module and the other module without use of the guard word to protect the stack frame, wherein the one module is a caller module and the other module is a called module called by the caller module, and wherein the one module includes a store guard word condition instruction to be used by the caller module to write the guard word in the stack frame based on determining that the one module and the other module support use of the guard word, and wherein the other module includes a verify guard word condition instruction to be used by the called module to check the guard word of the stack frame based on determining that the one module and the other module support use of the guard word to determine whether the guard word is an expected value.

7. The computer system of claim 6, wherein the one module includes a verify guard word condition instruction to be used in at least one of initializing or verifying the guard word in the stack frame.

8. The computer system of claim 6, wherein the method further comprises based on determining that the one module and the other module support use of the guard word, providing an indication that the one module and the other module are linked modules supporting use of the guard word.

9. A computer-implemented method of facilitating linking of modules of a computing environment, said computer-implemented method comprising:
  determining whether one module to be executed by a processor of the computing environment supports use of a guard word to protect a stack frame of the computing environment;
  determining whether another module to be linked with the one module supports use of the guard word to protect the stack frame;
  based on determining that at least one of the one module and the other module fails to support use of the guard word to protect the stack frame, providing an indication that the one module and the other module are linked modules not supporting use of the guard word; and
  based on the indication, processing the one module and the other module without use of the guard word to protect the stack frame, wherein the one module is a caller module and the other module is a called module called by the caller module, and wherein the one module includes a store guard word condition instruction to be used by the caller module to write the guard word in the stack frame based on determining that the one module and the other module support use of the guard word, and wherein the other module includes a verify guard word condition instruction to be used by the called module to check the guard word of the stack frame based on determining that the one module and the other module support use of the guard word to determine whether the guard word is an expected value.

10. The computer-implemented method of claim 9, wherein the one module includes a verify guard word condition instruction to be used in at least one of initializing or verifying the guard word in the stack frame.

11. The computer-implemented method of claim 9, further comprising based on determining that the one module and the other module support use of the guard word, providing an indication that the one module and the other module are linked modules supporting use of the guard word.

* * * * *